United States Patent [19]
Lee

[11] Patent Number: 5,403,403
[45] Date of Patent: Apr. 4, 1995

[54] METHOD FOR PROCESSING FLUORESCENT MATERIAL

[75] Inventor: Jae K. Lee, Kumi-si, Rep. of Korea

[73] Assignee: Goldstar Co., Ltd., Seoul, Rep. of Korea

[21] Appl. No.: 95,593

[22] Filed: Jul. 26, 1993

[30] Foreign Application Priority Data

| Jul. 27, 1992 | [KR] | Rep. of Korea | 13451/1992 |
| Jul. 27, 1992 | [KR] | Rep. of Korea | 13542/1992 |
| Aug. 4, 1992 | [KR] | Rep. of Korea | 13971/1992 |
| Aug. 4, 1992 | [KR] | Rep. of Korea | 13972/1992 |
| Aug. 4, 1992 | [KR] | Rep. of Korea | 23973/1992 |
| Dec. 10, 1992 | [KR] | Rep. of Korea | 23755/1992 |

[51] Int. Cl.⁶ .......................... C09K 11/01; B08B 7/00
[52] U.S. Cl. ............................... 134/42; 252/301.6 R; 252/301.4 S
[58] Field of Search .................... 134/10, 42, 36; 252/301.4 R, 301.4 S, 301.6 R

[56] References Cited

U.S. PATENT DOCUMENTS

| 3,647,522 | 3/1972 | Single | 252/301.4 R |
| 5,171,474 | 12/1992 | Tono | 252/301.4 S |

FOREIGN PATENT DOCUMENTS 0453685 10/1991 European Pat. Off. ..... 252/301.4 R

OTHER PUBLICATIONS

Masterton, et al. Chemical Principles 4th ed. W. B. Saunders Company, 1977, pp. 433–434.

*Primary Examiner*—Paul Lieberman
*Assistant Examiner*—Lorna M. Douyon
*Attorney, Agent, or Firm*—Finnegan, Henderson Farabow, Garrett & Dunner

[57] ABSTRACT

A method for processing fluorescent material which removes various impurities contained in fluorescent material recovered in developing a fluorescent coating on a fluorescent screen of a color image receiving tube. The recovered fluorescent material can therefore be reused. The method comprises the steps of recovering unexposed fluorescent material which comes off on being developed, dispersing the recovered fluorescent material in water, cleaning the dispersed fluorescent material with an alkali, draining and washing the resultant fluorescent material in water, dehydrating and drying the fluorescent material, and screen-sizing the dried fluorescent material through mesh. Optionally, the cleaned fluorescent material is surface-treated with a colloidal silica (water glass) solution and zinc hydroxide suspension.

13 Claims, 10 Drawing Sheets

$S^{-2}$
$Zn^{+2}$
$Cu^{+1}$
$Al^{+3}$ $S^{-2}$
$Zn^{+2}$
$Cu^{+1}$ relative light emitting intensity wavelength (nm)

METHOD FOR PROCESSING FLUORESCENT MATERIAL

BACKGROUND OF THE INVENTION

1. Field of the Invention

The present invention relates to a method for processing fluorescent material. More particularly, the present invention relates to a method of processing fluorescent material for reuse, the fluorescent material recovered at the developing step during formation of the fluorescent screen of a color image receiving tube.

2. Discussion of the Background Art

A conventional process used to form the fluorescent screen of a color image receiving tube is shown in FIG. 1. First the fluorescent material is prepared. Then it is combined with ammonium dichromate, polyvinyl alcohol, and a surfactant in water to form a slurry. Third, the slurry is injected into the inner face of the panel, which is the faceplate of the color image receiving tube, and then coated thereon with a rotary coater at a high rotation rate, forming a smooth coating. In the fourth step, the fluorescent coating formed on the panel is dried, a shadow mask is mounted to a inner face of the panel, and the coating is exposed, forming cross-linkages between polyvinyl alcohol and sodium dichromate. The fifth step comprises developing the fluorescent coating in warm water to remove any unexposed fluorescent material, thus forming a fluorescent screen. These steps are carried out repeatedly so that green, blue and red fluorescent materials are coated in sequence. As a result, the fluorescent screen of a stripe form or a dot form is obtained.

The amount of unexposed fluorescent material removed from the panel during the development step can be up to 70 to 80% of total fluorescent material initially prepared. Conventionally, these materials are discarded as is, or recovered for reuse after being washed with warm water. It is wasteful to discard these fluorescent materials, particularly red fluorescent material, which contains expensive rare earth elements, and, additionally, the heavy metals and sulfur components of the materials add to environmental pollution. Therefore, the fluorescent materials which come off the panel in the developing step should be recovered.

In a conventional method for recovering the fluorescent material washed from the panel in the developing step, the material is recovered by centrifugation. The recovered fluorescent material contains not only polyvinyl alcohol and surfactant from the slurry, but also various impurities and oil components involved in the process for forming fluorescent screen. To reuse the recovered fluorescent material, the slurry ingredients, impurities, and oil components must be removed.

FIG. 2 shows a conventional method for processing recovered fluorescent material. The recovered fluorescent material is first dispersed in water to dissolve particle cohesion. Then, the dispersed fluorescent material is cleaned with a heated aqueous alkali solution, held quiescent to drain the supernatant, and washed with water, ridding the material of the slurry ingredients, impurities, and oil components. The fluorescent material is dehydrated, dried, and passed through mesh for screen-sizing.

A drawback of this conventional method for processing recovered fluorescent material is that the steps of cleaning the fluorescent material with a heated aqueous alkali solution, draining the supernatant, and washing with water, must be repeated at least 2 to 3 times to adequately remove the impurities from the recovered fluorescent material. This process is therefore tedious and time-consuming.

As stated above, the fluorescent screen of a color image receiving tube is formed by coating and developing fluorescent materials of green, blue, and red color in sequence. The screen is not complete until the fluorescent materials of all three primary colors are coated and developed. When a fluorescent coating of blue is formed after patterning a green fluorescent coating, a slurry of the blue fluorescent material is coated on the inner face of the panel on which the green fluorescent coating is already patterned. When developing the blue fluorescent coating, green fluorescent material that is loosely attached to the panel is collected with the remnants of the blue fluorescent material. Similarly, subsequent application of red fluorescent material to the panel results in small amounts of both blue and green material in the red fluorescent material recovered during developing.

The conventional processing step in which the recovered fluorescent material is cleaned with a heated aqueous alkali solution cannot separate fluorescent materials of different colors. Therefore, if the fluorescent screen of a color image receiving tube is formed with recovered fluorescent materials incorporating more than one color, the desired luminescence may not occur. For example, FIG. 3 shows the fluorescent material of green color incorporated with the recovered fluorescent material of blue color. The two fluorescent materials will luminesce together, even when only blue fluorescent material is required to luminesce. Also, the fluorescent material of green color or the fluorescent material of blue color incorporated with the recovered fluorescent material of red color will luminesce together with the fluorescent material of red color, even when only a red luminescence is required. Thus, incorporation of one fluorescent material with another detrimentally affects the luminescent color purity and the picture quality of a fluorescent screen.

The fluorescent material may be attached to a pigment by a pigment-attaching agent and this material may also be recovered for reuse. A method for processing such pigment-attached fluorescent material is disclosed in Japanese Patent Publication No. Sho 59-7747. This method comprises the steps of recovering the pigment-attached fluorescent material, adding the recovered fluorescent material to an aqueous alkali solution to corrode the pigment-attaching gelatin, and attaching a suitable amount of new pigment to the resultant fluorescent material, making it reusable.

This method for processing pigment-attached fluorescent material is much less successful when latex, not gelatin, is used as the pigment-attaching agent because the aqueous alkali solution cannot corrode the latex. Another method, however, exists in which the pigment attached to fluorescent material with latex is removed by baking the recovered fluorescent material at 450° C. This method incinerates the latex, leaving the ashes within the fluorescent material. These ashes remain even after repeated cleaning attempts and use of the recovered fluorescent material in a fluorescent screen can cause staining and low luminous efficiency.

In another conventional process for forming the fluorescent screen of a color image receiving tube, a slurry of fluorescent material is prepared by dispersing fluorescent material in water and adding polyvinyl alcohol in combination with sodium dichromate and surfactants. The sodium dichromate is a photosensitive agent. This slurry is coated on an inner face of a panel, dried, and exposed to ultra violet rays. The ultra violet rays cause the dichromate in the slurry to react with the polyvinyl alcohol. The polyvinyl alcohol is changed into α-ketonic acid and β-hydroxide, which are insoluble in water.

The photo-crosslinking reaction occurring in the slurry is as follows. The dichromic acid of the photosensitive agent changes into hexavalent chromic acid upon reception of the UV rays. The hexavalent chromic acid links with polyvinyl alcohol to form an ester, which subsequently forms a ketone group, and the ketone group becomes an unsaturated ketone due to an intramolecular dehydration reaction. The unsaturated ketone changes into a chromic acid ester, which is hydrolyzed to form α-keto-1,2-glycol. The β-keto-1,2-glycol is cleaved into α-ketonic acid linked with trivalent chrome and a β-hydroxy acid. As a result, the slurry becomes insoluble in water.

There are disadvantages, however, in the use of recovered fluorescent material processed by this method. In fluorescent screens formed from a slurry of this material, the coating in areas receiving insufficient light or exhibiting low cohesiveness may easily deteriorate. In attempting to solve this problem, the exposure amount may be increased, but then the fluorescent coating becomes to thick and interferes with the part on which it is being formed. This results in a false, mixed color on the fluorescent screen. In addition, because the photo-crosslinking reaction is affected by water, the coating must be sufficiently dry before exposure can take place. This increases the time and energy required by the process.

SUMMARY OF THE INVENTION

Accordingly, in one aspect or object of the present invention, there is provided a simple method for processing fluorescent material, whereby impurities are removed from a recovered fluorescent material to obtain salvage fluorescent material which is improved in color purity and coating-ability.

In another aspect or object of the present invention, there is provided a method for processing fluorescent material, whereby Al incorporated in recovered fluorescent material of blue color is removed to improve the luminescence color purity of the salvage fluorescent material.

In an additional aspect or object of the present invention, there is provided a method for processing fluorescent material, whereby pigment-attaching agent is completely removed from pigment-attached, recovered fluorescent material to improve the luminescence of the salvage fluorescent material.

In a further aspect or object of the present invention, there is provided a method for processing fluorescent material, whereby when recovered fluorescent material is cleaned, the recovered fluorescent material is precipitated in a short time using precipitating agent to improve the recovery rate of salvage fluorescent material.

In a still further aspect or object of the present invention, there is provided a method for processing fluorescent material, whereby a bivalent alcohol of low molecular weight is added on forming a slurry of fluorescent material to facilitate recovering fluorescent material and drying the fluorescent coating.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, the method for processing fluorescent material comprises a step of recovering fluorescent material removed from a fluorescent screen of a color image receiving tube during the developing of a fluorescent coating on the fluorescent screen, a step of dispersing the recovered fluorescent material in water, a step of cleaning the dispersed fluorescent material with an aqueous alkali solution, a step of leaving the alkali-cleaned fluorescent material quiescent to drain the supernatant, a step of dehydrating and drying the water-washed fluorescent material, and a step of screen-sizing the dried fluorescent material through mesh to obtain salvage fluorescent material.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

The accompanying drawings, which are incorporated in and constitute a part of this specification illustrate embodiments of the invention and, together with the description, serve to explain the objects, advantages, and principles of the inventions. In the drawings.

DETAILED DESCRIPTION OF THE PREFERRED EMBODIMENTS

The present invention is further illustrated with reference to the following examples, these being indicative, however, of but a few of the various changes and modifications in which the principle of this invention and improvement may be employed.

EXAMPLE 1

Figure 4:
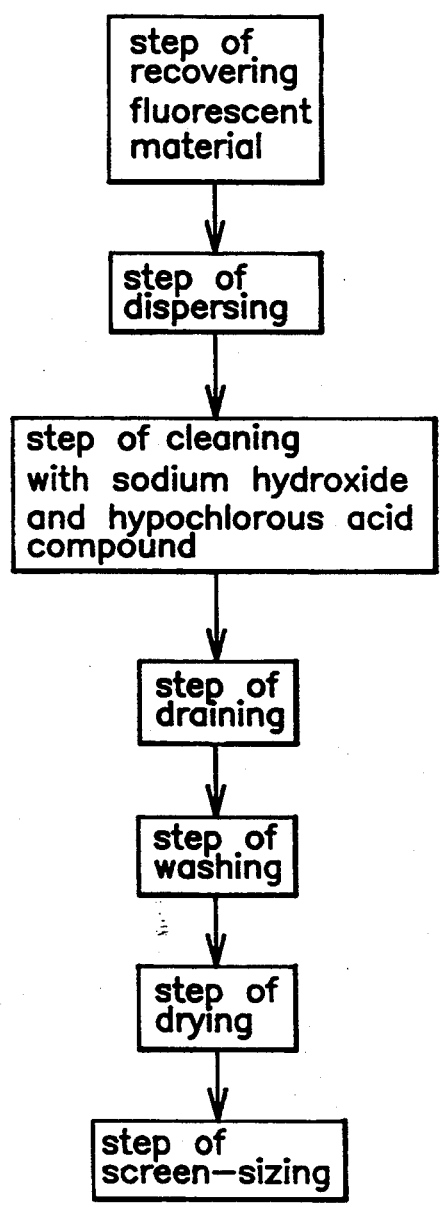
FIG. 4 is a block diagram illustrating a flow of a method for processing fluorescent material according to Example 1 of the present invention.

FIG. 4 shows a flow of a method for processing fluorescent material according to the first Example of the present invention.

In this Example, the aluminum component of fluorescent material of green color incorporated in recovered fluorescent material of blue color was removed by a process which comprises a step of recovering blue fluorescent material with centrifuge; a step of dispersing the blue recovered fluorescent material in water; a step of cleaning the dispersed fluorescent material along with sodium hydroxide and hypochlorous acid compound; a step of leaving the alkali-cleaned fluorescent material still and draining the resultant supernatant; a step of washing the resultant fluorescent material with water 2 to 3 times; a step of dehydrating the water-washed fluorescent material by drying in an electric furnace at about 120° to 160° C. for about 8 hours, and a step of screen sizing the dried fluorescent material through 40 mesh to remove macro granules of fluorescent material.

Figure 5A:
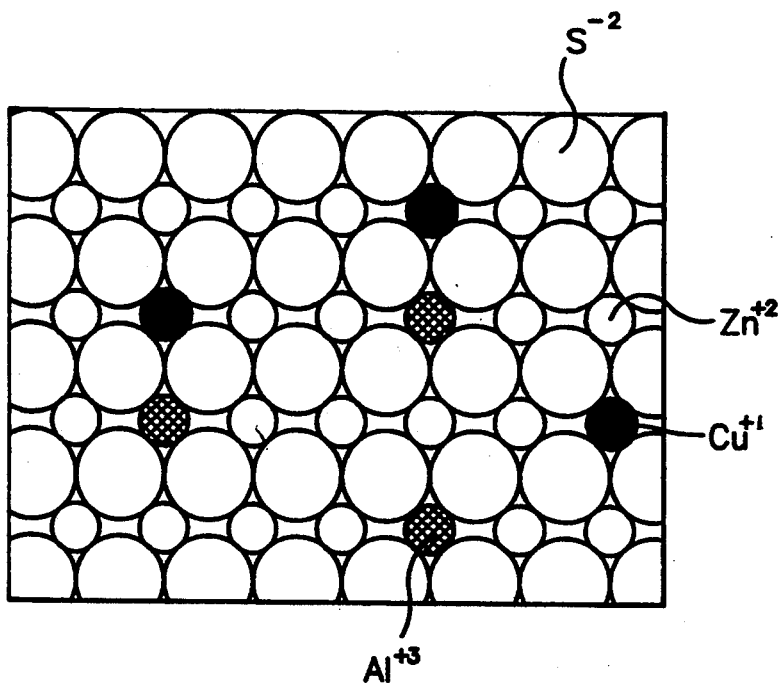
FIG. 5A is a fragmentary, schematic diagram illustrating fluorescent material of green color incorporated in recovered fluorescent material of blue color.

FIG. 5A is a fragmentary, schematic illustration that shows fluorescent material of green color incorporated in recovered fluorescent material of blue color. In the ZnS structure of recovered fluorescent material of blue color, copper and aluminum of fluorescent material of green color, which are coactivators, were substituted for $ZN^{+2}$ to be linked with $S^{-2}$. In the recovered fluorescent material of blue color in which green fluorescent material was incorporated, the blue fluorescent material is ZnS:Ag, whereas the green fluorescent material is ZnS:Cu, Al. The aluminum, which is an activator, in the green fluorescent material incorporated in the recovered fluorescent material of blue color is more reactive to chlorine than the zinc or silver in the blue fluorescent material.

The method for processing fluorescent material according to Example 1 will be, in detail, described as follows.

Fluorescent material of blue color which came off a fluorescent screen when the blue fluorescent coating was developed on the green fluorescent material-patterned fluorescent screen was recovered using a centrifuge. The recovered fluorescent material of blue color was dispersed in water, to which sodium hydroxide and a hypochlorous acid compound were subsequently added. The resultant dispersion was stirred and then it was washed with aqueous solution of alkali. As a result, aluminum in the fluorescent material of green color reacted with the chlorine of the hypochlorous acid compound, and the aluminum was thereby separated from the fluorescent material of green color.

The hypochlorous acid compound used in this Example may comprise a compound having a hypochlorous group, such as potassium hypochlorite and sodium hypochlorite. For example, potassium hypochlorite reacted as follows:

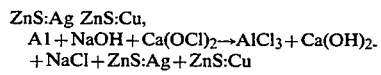

$Al + NaOH + Ca(OCl)_2 \rightarrow AlCl_3 + Ca(OH)_2 + NaCl + ZnS:Ag + ZnS:Cu$

As seen in above reaction scheme, Cl was selectively reacted with Al in the green fluorescent material incorporated in the recovered fluorescent material of blue color. The reason for the selective reaction was that the standard heat of formation of aluminum chloride was lower than those of any others, as shown in following table 1.

TABLE 1

| Standard Formation heat of a chloride compound | |
|---|---|
| AgCl | −127 KJ/mol |
| CuCl | −137 KJ/mol |
| ZnCl$_2$ | −415 KJ/mol |
| AlCl$_3$ | −704 KJ/mol |

That is, reaction of aluminum with chlorine generates a greater quantity of heat than with other elements, and the result, AlCl$_3$, is more stable than other compounds.

Zinc reacts with chlorine relatively well, and ZnS, which is the core of blue fluorescent material, may be cleaved if a quantity of hypochlorite is used. In this example, the fluorescent material of green color which was incorporated in fluorescent material of blue color was in the ratio of 2.5%. Thus, care must be taken to add hypochlorite in an amount not exceeding 2.5% when the cleaning step is carried out with alkaline solution.

Figure 5B:
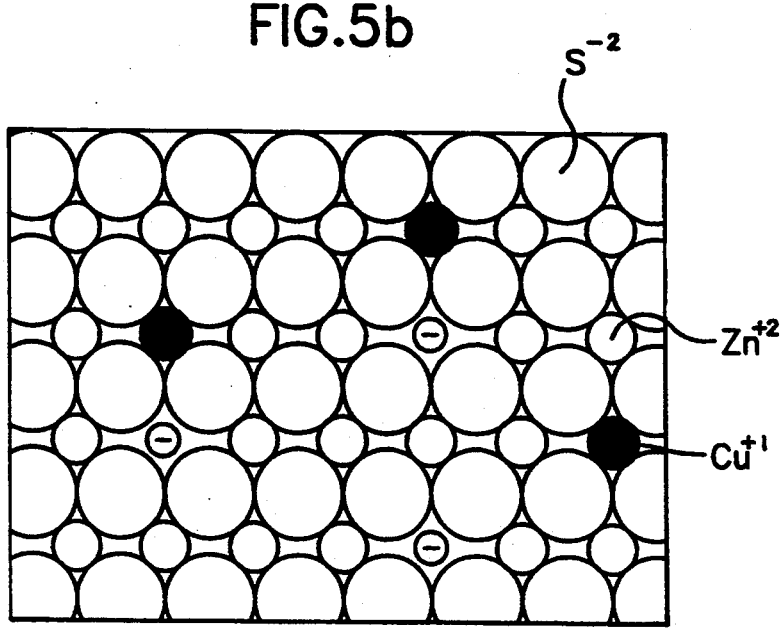
FIG. 5B is a fragmentary, schematic diagram illustrating that Al is removed from fluorescent material of green color incorporated in recovered fluorescent material of blue color.

FIG. 5B shows the structure of the recovered fluorescent material of blue color wherein the aluminum ions (Al$^{+3}$) of the incorporated green fluorescent material are removed by the above method. The portions in which aluminum ions were removed had negative charges and thus, did not play a role as a luminescent center. As a result, mixed color was not exhibited when the fluorescent material of blue color luminesced.

Figure 6:
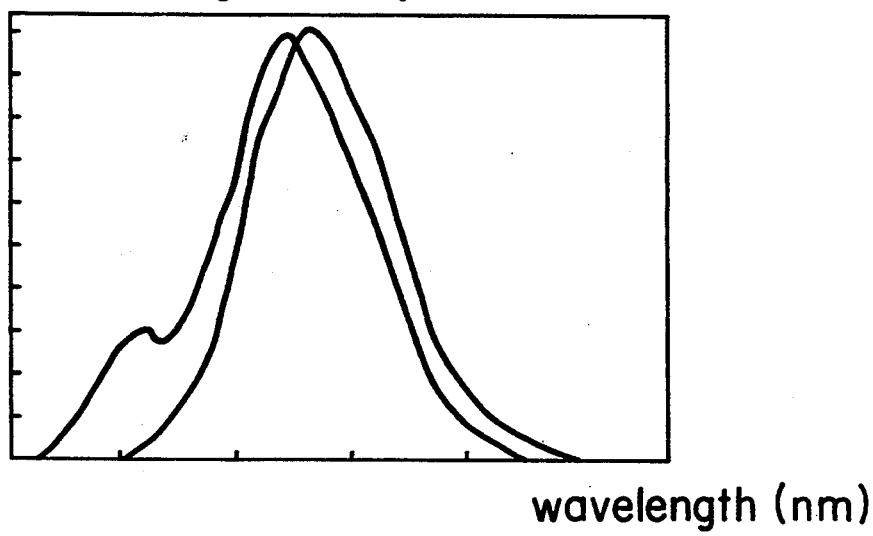
FIG. 6 is an emission spectrum of fluorescent material of green color.

FIG. 6 is a graph showing an emission spectrum of fluorescent material of green color. As shown in the figure, the emission spectrum of green fluorescent material is moved to shorter wave if the luminescent center is dependent only on copper ions (Cu$^{+1}$) in the green fluorescent material.

Figure 7:
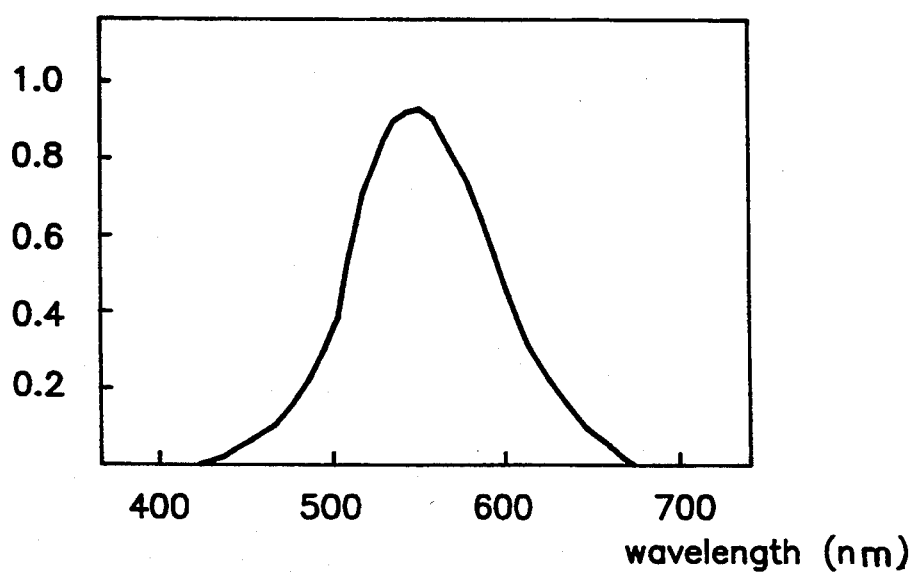
FIG. 7 is a graph illustrating a spectral luminous efficacy of human eyes.

FIG. 7 is a curve for spectral luminous efficacy for human eyes, which shows that human eyes are most sensitive to light having a wavelength of 550 nm and the efficacy becomes weaker at shorter or longer wavelengths.

Referring to FIGS. 6 and 7, the light of the green fluorescent material treated with hypochlorite and alkaline solution has a shorter wavelength than that of the untreated. Therefore, the green light of the treated fluorescent material is weakly detected by human eyes and the overall light is closer to a blue color than that of the untreated material.

Figure 1:
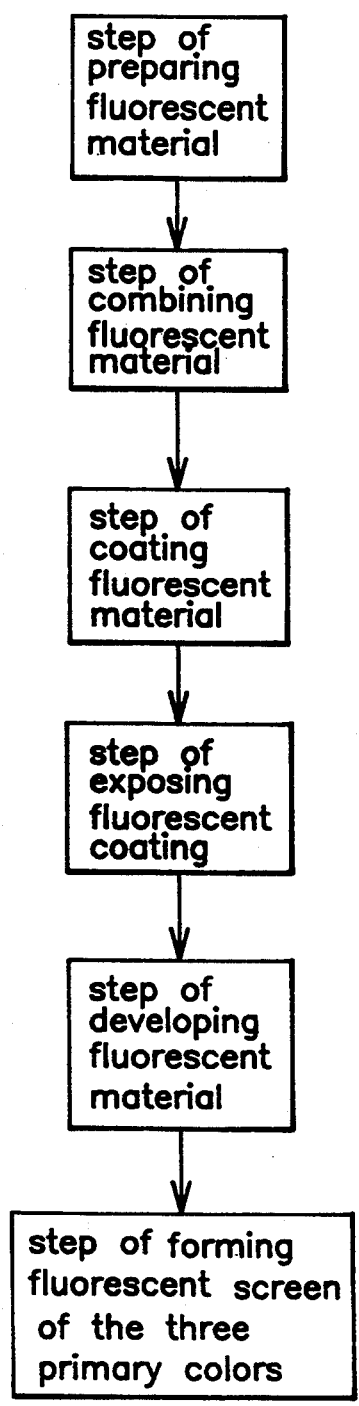
FIG. 1 is a block diagram illustrating the flow of a conventional process for forming a fluorescent screen of a color image receiving tube.
Figure 2:
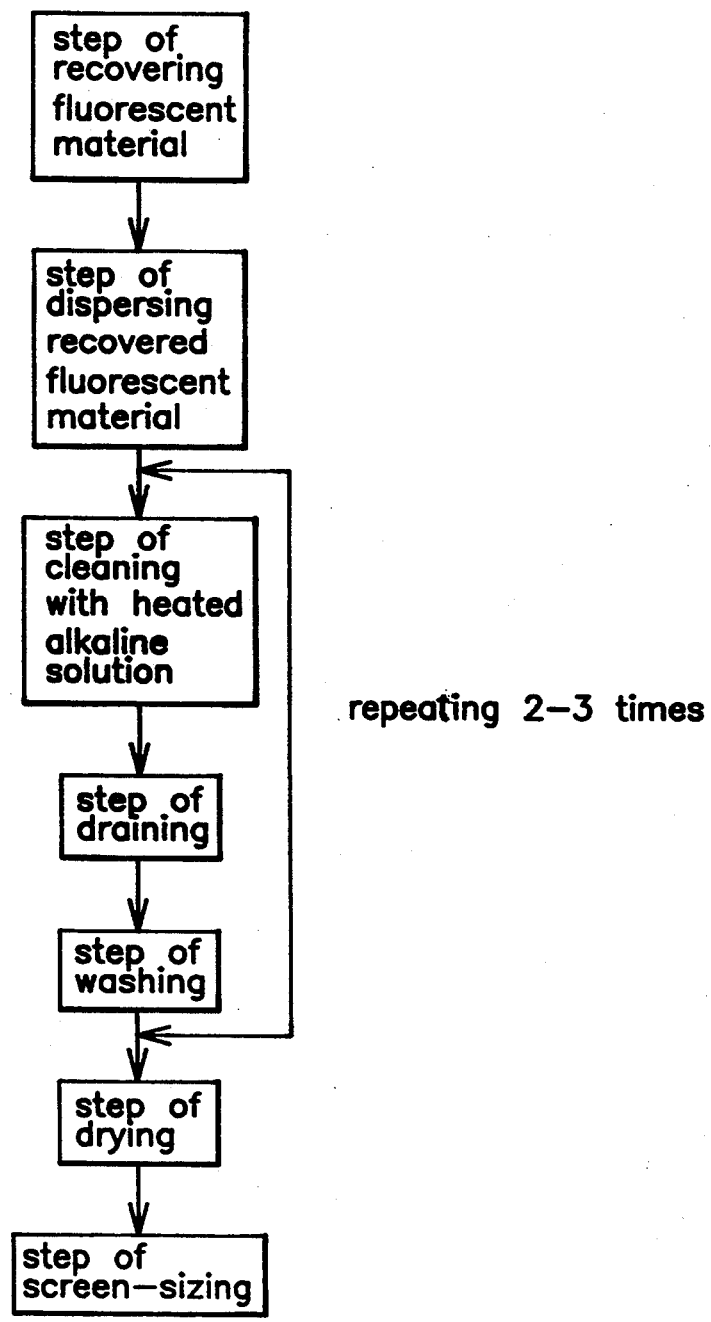
FIG. 2 is a block diagram illustrating a flow of a conventional method for processing fluorescent material.

In contrast with the conventional processing method of FIG. 2, the method for processing fluorescent material according to Example 1 of the present invention is capable of removing additives used in creating a slurry of fluorescent material, as well as the incorporated green fluorescent material, from the recovered fluorescent material of blue color, by carrying out the cleaning step with sodium hydroxide and hypochlorite only one time.

EXAMPLE 2

Figure 8:
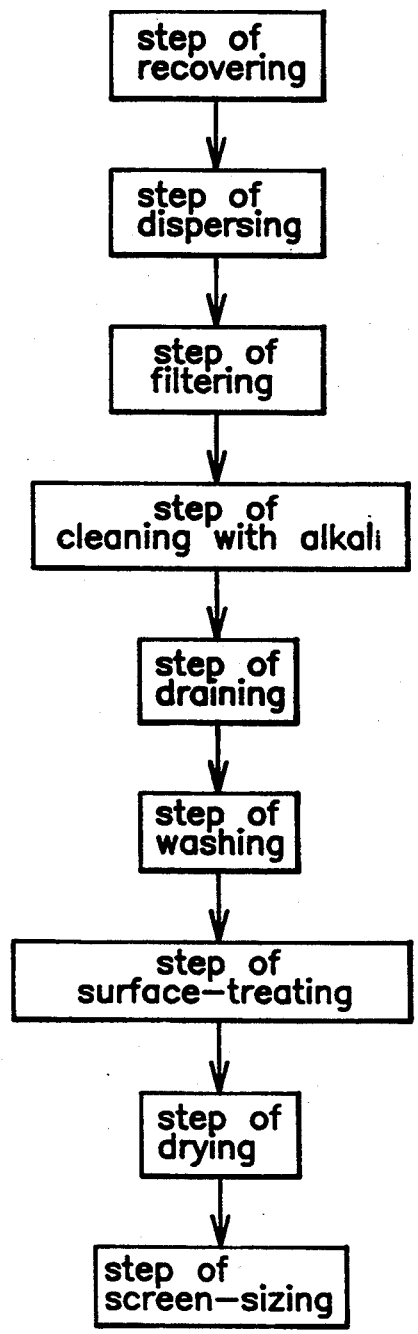
FIG. 8 is a block diagram illustrating a flow of a method for processing fluorescent material according to Example 2 of the present invention.

FIG. 8 is a block diagram illustrating a flow of a method for processing fluorescent material according to Example 2 of the present invention.

Figure 3:
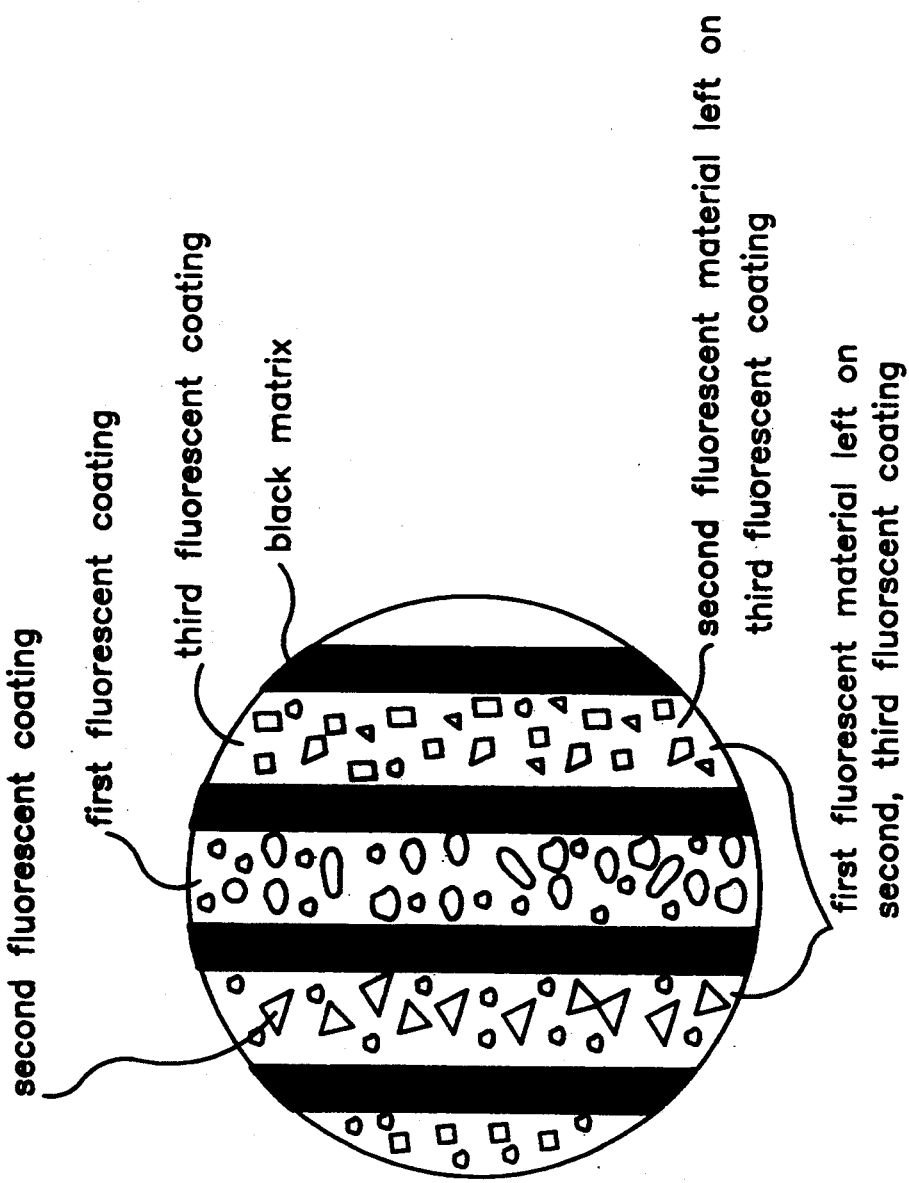
FIG. 3 is a fragmentary enlarged view illustrating a fluorescent screen of a color image receiving tube which is formed of fluorescent material recovered by a conventional method.

As shown in the figure, the method for processing fluorescent material has an additional step of treating the surface of the fluorescent material in order to increase dispersion and coating-ability, which is subsequent to the cleaning step with alkaline solution of the method according to Example 1 as shown in FIG. 3.

In the method for processing fluorescent material according to the Second Example, recovered fluorescent material was dispersed in water and filtered to remove impurities. The filtered fluorescent material was again dispersed in water which was 1.5 times the weight of the filtered fluorescent material, and stirred. To the resultant solution, about 0.06 to 0.3% by weight of aqueous solution of alkali was added, as based on the recovered fluorescent material, the solution was heated to about 65° to 90° C. with stirring for about 1 hour, and then left still to drain the supernatant. The drained fluorescent material was again washed with water 2 to 3 times.

A step of treating the surface of the washed fluorescent material was carried out in order to increase dispersion and coating-ability of the fluorescent material. That is, the fluorescent material was combined with water in an amount of about 1.5 to 4 times that of the fluorescent material, to which about 0.03 to 1.5% by weight of colloidal silica solution (water glass) having 20% colloidal silica component was added, as based on the weight of the recovered fluorescent material. To the resultant fluorescent material, about 1.0 to 3.5% by weight of zinc hydroxide suspension was added, adjusted to pH 8 to 9, and the solution was then stirred for about 2 to 6 hours.

The steps of drying and screen-sizing the surface-treated fluorescent material were carried out in a manner similar to Example 1.

The zinc hydroxide suspension was prepared by pouring 2 liters of water into about 300 g of zinc chloride powder and dispersing the zinc chloride powder using a micro agitator at about 1,000 to 3,000 r.p.m. for about 30 min.

It was important to recognize the following results when the surface-treating step was carried out. As mentioned above, the amount of the colloidal silica solution was preferably on the order of about 0.03 to 1.5% by weight based on the weight of the recovered fluorescent material. If too much of the colloidal silica solution was used in comparison with the amount of the recovered fluorescent material, luminous efficiency of the fluorescent material went down and adhesiveness of the fluorescent material increased, resulting in mixed colors on the fluorescent screen. On the other hand, if too much zinc hydroxide was used compared to the amount of the recovered fluorescent material, the adhesiveness decreased, so that the fluorescent coating came off.

In addition, unless the powdered zinc hydroxide was dispersed at a high speed of about 1,000 to 3,000 r.p.m. for at least 30 min., particles of the fluorescent material became large, preventing the zinc hydroxide from being adsorbed to the surface of the fluorescent material.

Figure 9:
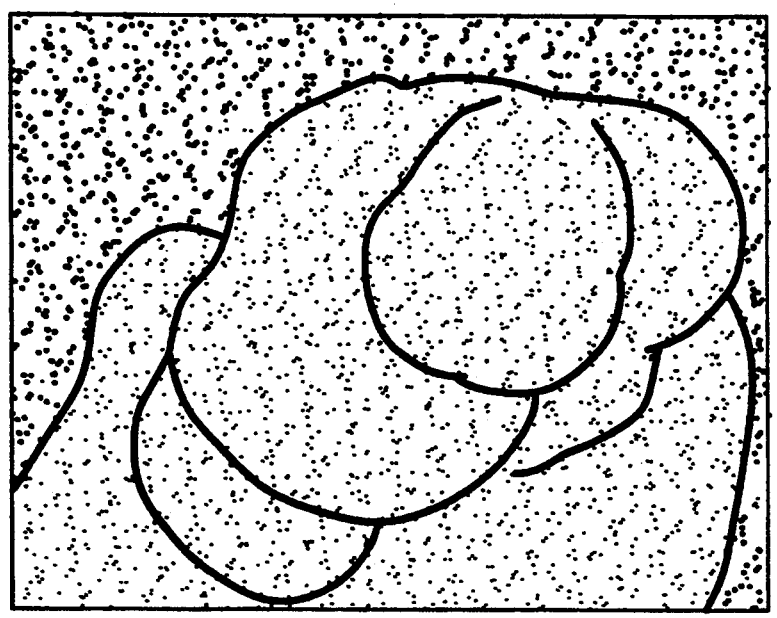
FIG. 9 is an electron micrograph showing a particle of the fluorescent material from which impurities are removed after a step of cleaning with alkaline solution according to Example 2 of the present invention.

In the method for processing fluorescent material according to Example 2, solid impurities were removed through the step of filtering the recovered fluorescent material dispersed in water, and additives which had been used in combining a slurry of fluorescent material, such as polyvinyl alcohol, were dissolved and removed from the fluorescent material by the action of heated alkaline solution which was added at the cleaning step. Through the step of treating the surface of the alkali-cleaned fluorescent material with colloidal silica solution and zinc hydroxide suspension, the surface of the recovered fluorescent material was coated with the colloidal silica which adsorbed finely dispersed particles of zinc hydroxide, as shown in FIG. 9. The colloidal silica which was coated on the surface of the fluorescent material protected the surface of the fluorescent material from impairment and pollution. The colloidal silica, moreover, increased dispersion of the particles to form a smooth coating. In addition, the particles of the zinc hydroxide prevented false mixed colors which were caused by one fluorescent material's remaining on graphite or a different fluorescent material during the coating and the developing steps.

FIG. 9 is an electron micrograph showing particles of fluorescent material, the surface of which are not treated after a cleaning step with an alkaline solution.

Figure 10:
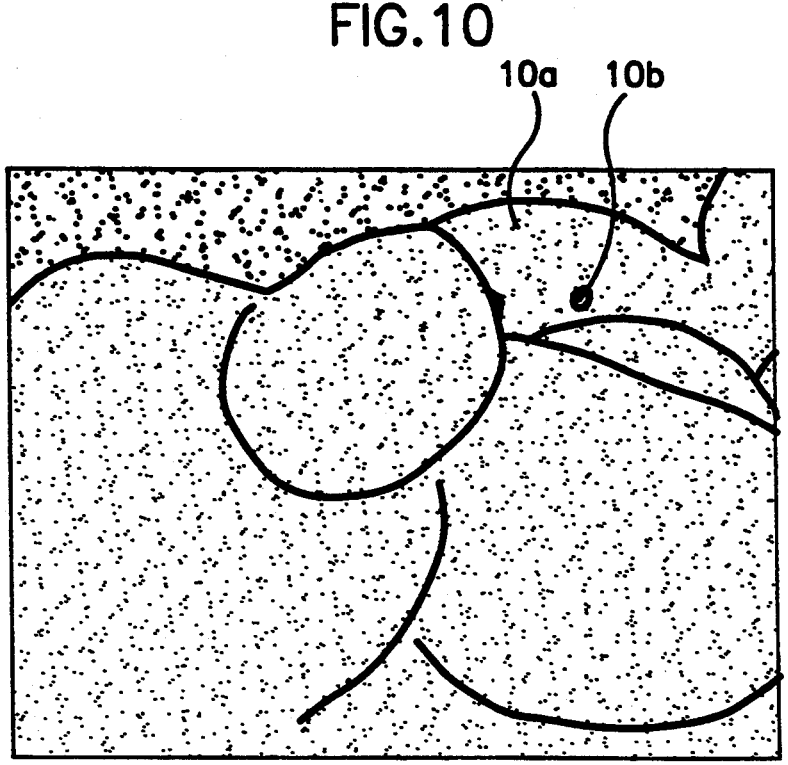
FIG. 10 is an electron micrograph showing a particle of the fluorescent material on which colloidal silica is attached after a step of surface-treating according to Example 2 of the present invention.

FIG. 10 is an electron micrograph showing particles of fluorescent material, the surface of which are treated after cleaning with an alkaline solution. In the figure, numeral 10a is a recovered fluorescent material and numeral 10b is a particle of colloidal silica.

EXAMPLE 3

Figure 11:
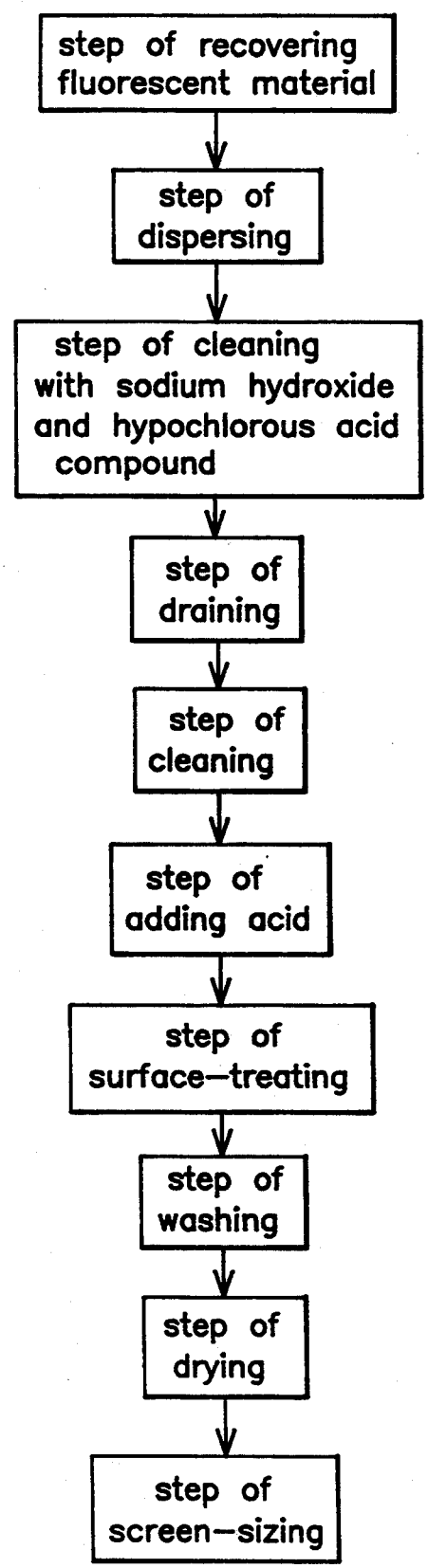
FIG. 11 is a block diagram illustrating the flow of a method for processing fluorescent material according to Example 3 of the present invention.

FIG. 11 is a block diagram showing a method for processing fluorescent material according to Example 3 of the present invention.

The method for processing fluorescent material according to Example 3 was different from that of Example 2 in that there was an additional step of acid-treating between the cleaning step with alkaline solution and the surface-treating step.

Referring to FIG. 11, the method for processing fluorescent material according to the Example will be, in detail, described.

65 kg of fine particles of fluorescent material which was recovered using a centrifuge were dispersed in a stainless steel tank containing 130 liters of water, to which 6 kg of sodium hydroxide and about 1.6 kg of calcium hypochlorite were added, and stirred for 3 hours, maintaining 80° C. After the cleaning with alkaline solution, the tank was left still, and then the supernatant was drained. The resultant fluorescent material was washed with warm water 2 times. To the washed fluorescent material, 120 liters of water was added and the solution was subsequently heated to 80° C. To the heated fluorescent material, nitric acid was added to adjust the pH of the fluorescent material to 3.0 and the solution was stirred for 1 hour. The acid-treated recovered fluorescent material was then washed with water 2 times, and 120 liters of water was again added and the mixture stirred for 1 hour. To the stirred fluorescent material, 0.3% by weight of zinc sulfate, as based on the weight of the recovered fluorescent material, and aqueous ammonia to adjust pH to 8.5 were added, and the resultant solution was stirred for 1 hour to treat the surface of the material. The treated fluorescent material solution was left still in order to drain the supernatant. The resultant fluorescent material was again washed with water two times, and dehydrated and dried in an electric furnace at 150° C. for 10 hours. A screen-sizing was carried out on the washed fluorescent material by passing it through mesh to obtain salvage fluorescent material of 56.5 kg.

In the cleaning step with alkaline solution, not only were various impurities decomposed by sodium hydroxide together with nascent oxygen of calcium hypochlorite but so too was a zinc blend incorporated in recovered fluorescent material of red color. Decomposition of only the zinc blend, which is found in green and blue fluorescent material, in red fluorescent material was selected because the zinc was superior in reactivity to yttrium, which is a red fluorescent material.

$$ZnS + 2NaOH + Ca(OCl)_2 \rightarrow ZnCl_2 + Ca(OH)_2 \cdot xH_2O + NaCl$$

Thus, in the water washing step after the alkaline solution cleaning step, even the zinc blend of the recovered fluorescent material was decomposed, so that various impurities were removed.

On the other hand, in the acid-treating step, water-insoluble calcium hydroxide was dissolved by nitric acid.

$$Ca(OH)_2 \cdot xH_2O + HNO_3 \rightarrow CaNO_3 + xH_2O$$

In addition, in the surface-treating step, the added zinc sulfate reacted with the aqueous ammonia to form zinc hydroxide on the surface of the recovered fluorescent material. This produced salvage fluorescent material which exhibited improved coating ability when forming a fluorescent screen.

$$ZnSO_4 + 2NH_4OH \rightarrow Zn(OH)_2 + SO_4^{2-} - 2NH_4^+$$

In the cleaning step with the alkaline solution, potassium hydroxide and lithium hydroxide instead of sodium hydroxides, and sodium hypochlorite instead of calcium hypochlorite may be used.

Also, in the acid-treating step, hydrochloric acid or acetic acid may be substituted for nitric acid so as to adjust the pH of the fluorescent material.

EXAMPLE 4

The Example 4 of the present invention relates to a method for processing pigment-attached fluorescent material, which makes use of peroxydisulfate to corrode latex, a pigment-attaching agent, efficiently.

Figure 12:
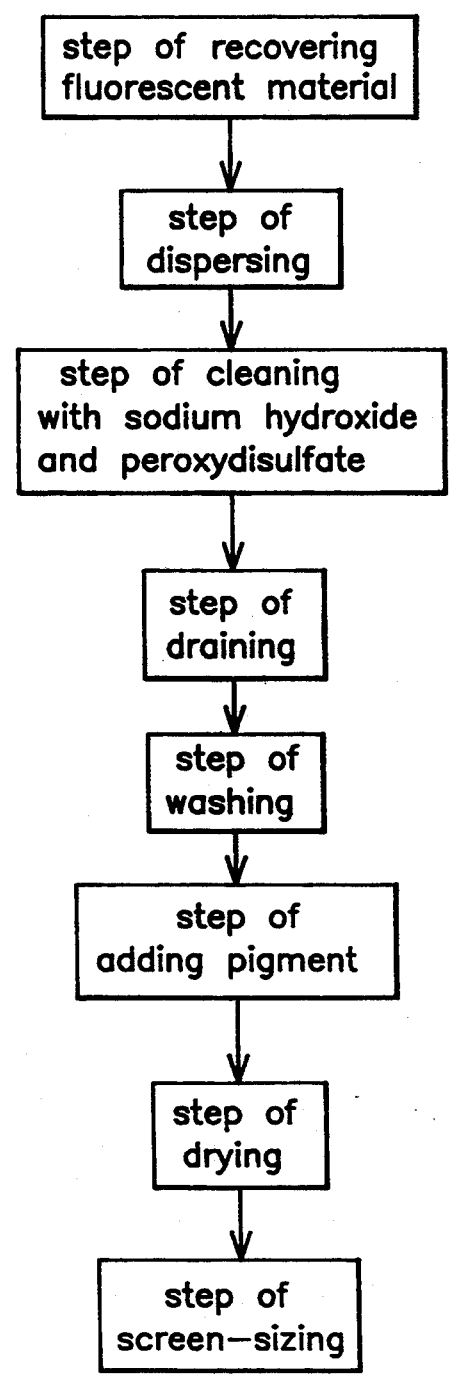
FIG. 12 is a block diagram illustrating the flow of a method for processing fluorescent material according to Example 4 of the present invention.

FIG. 12 is a block diagram illustrating a flow of the method for processing fluorescent material according to Example 4. As shown in FIG. 12, the method for processing fluorescent material has an additional step of attaching pigment to recovered fluorescent material after the cleaning step with alkaline solution of Example 2.

The attaching step was carried out as follows. The fluorescent material to which pigment was attached through latex was coated on the inner face of panel, exposed, and developed, so that a fluorescent screen was formed. At the developing step, unexposed, pigment-attaching fluorescent material came off the panel and was recovered using a centrifuge. One (1) kg of the recovered fluorescent material was added to a beaker containing 2 kg of water and dispersed. To the dispersed fluorescent material, 9% by weight of sodium hydroxide and 0.5% by weight of dipotassium peroxydisulfate were added, and the solution was heated to 80° C. and then cleaned in alkaline solution with stirring. The cleaned fluorescent material was left still for 30 min. and the supernatant was drained. In the cleaning step with alkaline solution, when heated, the peroxydisulfate became a strong oxidant, corroding the latex as follows;

$$S_2O_8^{2-} \xrightarrow{\text{heating}} 2SO_4^-$$

The cations which are able to link onto the peroxydisulfate may comprise sodium ions ($Na^+$), ammonium ions ($NH_4^+$), lithium ions ($Li^+$), and calcium ions ($Ca^{2+}$) besides potassium ions ($K^+$). According to this principle, cohesion of the pigment was destroyed, so that the pigment was removed. Subsequently, the recovered fluorescent material was cleaned with water to remove the pigment which had been attached to the fluorescent material as well as the various polymeric materials and impurities used in forming a slurry, so that only pure recovered fluorescent material remained. The pure recovered material was cleaned with 2 liters of water 3 times, centrifuged, and then, dispersed in 1.5 liters of water. To the dispersed solution, cobalt aluminate ($Al_2O_3CoD$) pigment was added in amount of 0.25% by weight as based on the weight of the recovered fluorescent material, and sulfuric acid was added to adjust pH to 5.5. Subsequently, 0.3% by weight of latex was added and the solution stirred for 30 min. The pigment and the latex came to surround the fluorescent material core. The stirred fluorescent material was cleaned with water, dehydrated and dried in an electric furnace at 150° C. for 8 hours. While the fluorescent material dried, the latex hardened, so that the pigment attached to the recovered fluorescent material core.

The method for processing fluorescent material according to the Example 4 is capable of application to recovered fluorescent material of any color if it is attached with pigment through latex, a pigment-attaching agent.

EXAMPLE 5

This Example relates to a method for processing fluorescent material which makes use of a precipitating accelerator at the water washing step following the surface-treating step to precipitate particles of recovered fluorescent material in a short time, so that salvage fluorescent material is easily obtained.

Recovered fluorescent material was dispersed in water and a surface treating step was carried out to protect the particles of the recovered fluorescent material and to improve the coating-ability thereof, as described in Example 2.

Subsequently, a precipitating step with salt was carried out to precipitate particles of the recovered fluorescent material. That is, the surface-treated fluorescent material was dispersed in water and stirred sufficiently. To the dispersed fluorescent material, polyvalent, non-metallic salt was added and then, stirred. The polyvalent salt is capable of precipitating the particles of the recovered fluorescent material as well as virgin particles, so it may be used as a precipitating accelerator. When the polyvalent salt remained in the fluorescent material until the step of drying the recovered fluorescent material, it affected the features of fluorescent material. Therefore, it was preferable to use material which was removable at the drying step as the precipitating accelerator.

It will be further described with an example of using ammonium carbonate as a precipitating accelerator.

Ammonium carbonate is decomposed in water as follows;

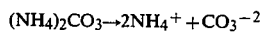

$$(NH_4)_2CO_3 \rightarrow 2NH_4^+ + CO_3^{-2}$$

The decomposed cation ($NH_4^+$) and the decomposed anion ($CO_3^{-2}$) were attached to the surface of the recovered fluorescent material. As such ions attached, the particles of the recovered fluorescent material became large, and ultimately, became macro-particles, which precipitated quickly. Accordingly, the precipitation rate of the recovered fluorescent material increased due to the precipitating accelerator.

As described above, even if supernatant which results from precipitating the recovered fluorescent material by adding the salt was removed, the cation and the anion which were attached to the particles of the recovered fluorescent material remained as is.

After being cleaned with water, the recovered fluorescent material was dried and passed through mesh to obtain salvage fluorescent material. On drying the recovered fluorescent material, the anion and the cation which were attached to the recovered fluorescent material were decomposed as follows;

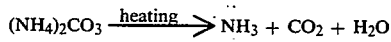

$$(NH_4)_2CO_3 \xrightarrow{heating} NH_3 + CO_2 + H_2O$$

That is, the ammonium carbonate which was used as a precipitating accelerator was decomposed, when heated, into ammonia gas and carbon dioxide gas with steam occurring, and thus completely removed from the recovered fluorescent material to perfection. Thus, the precipitating accelerator was removed after the drying step, so that the precipitating accelerator did not affect the features of the recovered fluorescent material at all.

Consequently, in the method for processing fluorescent material according to Example 5 of the present invention, any nonmetallic, polyvalent ionic salts could be used as a precipitating accelerator, if they decomposed and were thus completely removed from the recovered fluorescent material perfectly when heated. Ammonium sulfate worked in addition to ammonium carbonate.

In addition, the salt-precipitating step in the method for processing fluorescent material according to the present invention is applicable to a solution which is being used at the step of cleaning fluorescent material with water, a solution which is being used at the step of treating the surface of recovered fluorescent materials following the step of dispersing the recovered fluorescent material in water, or a solution which is being used after the step of attaching pigment to the surface-treated fluorescent material, as well as a solution having other cleaning agents in addition to water in order to improve the cleaning effects thereof.

Moreover, the salt-precipitating step according to the present invention is applicable not only to a method for processing recovered fluorescent material to obtain salvage fluorescent material, such as in the present invention, but also to a method for forming virgin fluorescent material powder.

In the case of applying the salt-precipitating step to a method for forming virgin fluorescent material powder to precipitate virgin fluorescent material easily, virgin fluorescent material was prepared by combining main and submaterial of fluorescent material with a solvent which facilitated baking. The solution was baked at about 1,200° to 1,700° C. to form fluorescent material powder, the fluorescent material powder was dispersed in water, the surface of the powder was treated to protect the particles of the fluorescent material and improve the coating ability of the fluorescent material, the fluorescent material powder was precipitated with the salt as described above, and the solution was cleaned, dried, and screen-sized.

EXAMPLE 6

This Example relates to a slurry of fluorescent material. Polyvinyl alcohol and fluorescent material powder were added to water in combination with dichromate, which played a role of photo-sensing agent, and bivalent alcohol of low molecular weight, which is a surfactant. The mixture was stirred to disperse the above components sufficiently, so that a slurry of fluorescent material was formed.

The bivalent alcohol of low molecular weight was selected from a group consisting of ethylene glycol and tetraethylene glycol having a molecular formula $HO(CH_2CH_2O)_4H$, and was on the order of about 0.15 to 5.0% by weight as based on the weight of the slurry.

In the slurry of fluorescent material according to the present example, the glycol, a bivalent alcohol of low molecular weight, is liquid at room temperature, compatible with water, and has a high boiling point. Ethylene glycol is the simplest of the bivalent alcohols of low molecular weight. Its boiling point is 197.5° C.

According to this example, a slurry of fluorescent material including bivalent alcohol of low molecular weight was injected onto the inner face of a panel of a color image receiving tube to coat a fluorescent screen thereof, and dried. Water, having a relatively low boiling point, was easily vaporized, and the resultant coating was well-dried. In addition, α-ketonic acid and β-hydroxy acid were formed easily by the reaction of polyvinyl alcohol with dichromate, so that the photocrosslinking reaction proceeded sufficiently.

A fluorescent screen of a color image receiving tube was formed by the following process, using the slurry of fluorescent material according to the present invention.

Three hundred (300) grams of recovered fluorescent material and 90 g of 10% polyvinyl alcohol solution were added to 300 ml of water in combination with 15 ml of 5% dichromate solution, 18 ml of tetraethylene glycol, and suitable amount of surfactant to prepare a suspension of fluorescent material. The suspension was stirred sufficiently to form a slurry of fluorescent material. To the slurry, specific gravity-adjusting liquid was added to adjust the specific gravity of the slurry to 1.252. The resultant slurry was injected onto the inner face of a panel of color image receiving tube. The panel was rotated at a high speed to coat the injected slurry on the face, so that a fluorescent screen was formed. Excess amount of the slurry was removed. The fluorescent screen was dried, and a shadow mask was mounted to the inner face of the panel on which the fluorescent screen was formed. The fluorescent coating was exposed to UV rays emitted from an exposing machine for 20 to 25 seconds and developed in warm water. As a result, the fluorescent coating did not come off the panel and a suitable size of pixel was formed, with no interference by the coatings of different colors.

On the other hand, in the event that tetraethylene glycol was not contained in the suspension, the resultant fluorescent coating was exposed for 30 second under the condition identical to the above, and developed in warm water. The fluorescent coating did not come off the panel. It was, however, developed insufficiently. Furthermore, pixels became large, so that blue fluorescent material remained in the area of red and green fluorescent material.

Ethylene glycol or propane diol was also used as the bivalent alcohol of low molecular weight in the slurry according to the present invention, instead of tetraethylene glycol. The resultant fluorescent coating showed effects similar to the case of tetraethylene glycol. The bivalent alcohol of low molecular weight was preferably on the order of about 0.15 to 5.0% by weight. For example, when the amount was below 0.15% by weight, the desired effects of development were not induced. On the other hand, when the amount was above 5.0% by weight, in spite of short exposure time, even unexposed parts were developed, so that they were not removed upon development and attempted recovery.

From the foregoing, it is seen that the method for processing fluorescent material according to the present invention offers the following advantages:

First, when a color image receiving tube is manufactured, various impurities contained in the fluorescent material which is recovered at developing step are removed by applying one cleaning step with sodium hydroxide and hypochlorite. Accordingly, the manufacturing process becomes simple and luminescence color purity is improved. In addition, the fluorescent material cleaned with the alkaline solution is treated with zinc hydroxide suspension and colloidal silica solution, so that the coating-ability and the dispersion of the salvage fluorescent material are improved. The salvage fluorescent material acquires qualities similar to virgin fluorescent material. Accordingly, use of the salvage fluorescent material reduces the required quantity of virgin fluorescent material by one-third, providing cost reduction.

Second, latex used in attaching pigment to fluorescent material is corroded by peroxydisulfate, so that it is easily removed from fluorescent material. Accordingly, facility and process are simplified in comparison with conventional process that burns up the latex, improving work efficiency. Moreover, the problem of dust or ash which results from the burning is solved, improving the quality of the salvage material.

Third, the slurry of fluorescent material according to the present invention contains bivalent alcohol of low molecular weight, so that the photosensitivity of the fluorescent screen of a color image receiving tube is improved. In addition, the photo-crosslinking reaction of polyvinyl alcohol with dichromate prevents the fluorescent coating from being released during developing. Furthermore, the fluorescent coating is dried easily, reducing exposure time and energy and thus increasing productivity.

The foregoing description of preferred embodiments of the invention has been presented for purposes of illustration and description. It is not intended to be exhaustive or to limit the invention to the precise form disclosed, and modifications and variations are possible in light of the above teachings or may be acquired for practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for processing fluorescent material, which comprises the steps of:
   recovering fluorescent material removed from a fluorescent screen of a color image receiving tube on developing a fluorescent coating on said fluorescent screen;
   dispersing the recovered fluorescent material in water;
   cleaning the dispersed fluorescent material with an aqueous alkali solution;
   draining the resultant supernatant from said fluorescent material;
   washing the resultant fluorescent material with water by dispersing said resultant fluorescent material in water, adding ammonium carbonate as a precipitating accelerator, stirring the fluorescent material dispersion to precipitate said fluorescent material, and draining the supernatant therefrom;
   dehydrating and drying the washed fluorescent material; and
   screen-sizing the dried fluorescent material to obtain salvage fluorescent material.

2. A method for processing fluorescent material, which comprises the steps of:
   recovering fluorescent material removed from a fluorescent screen of a color image receiving tube on developing a fluorescent coating on said fluorescent screen;
   dispersing the recovered fluorescent material in water;
   cleaning the dispersed fluorescent material with an aqueous alkali solution and a hypochlorous acid compound, said hypochlorous acid compound acting to remove an aluminum compound of green fluorescent material;
   draining the resultant supernatant from said fluorescent material;
   washing the resultant fluorescent material with water by dispersing said resultant fluorescent material in water, adding ammonium carbonate as a precipitating accelerator, stirring the fluorescent material dispersion to precipitate said fluorescent material, and draining the supernatant therefrom;
   dehydrating and drying the washed fluorescent material; and
   screen-sizing the dried fluorescent material to obtain salvage fluorescent material.

3. The method of claim 2, wherein said hypochlorous acid compound is calcium hypochlorite.

4. The method of claim 2, wherein said hypochlorous acid compound is present in an amount below 2.5% by weight, based on the weight of said recovered fluorescent material.

5. A method for processing fluorescent material, which comprises the steps of:
   recovering fluorescent material removed from a fluorescent screen of a color image receiving tube on developing a fluorescent coating on said fluorescent screen;

dispersing the recovered fluorescent material in water;

filtering the dispersed fluorescent material;

cleaning the filtered fluorescent material with an aqueous alkali solution;

draining the resultant supernatant from the cleaned fluorescent material;

washing the resultant fluorescent material with water;

surface-treating the washed fluorescent material by dispersing said washed fluorescent material in water present in an amount 1.5 to 4 times the weight of said washed fluorescent material, adding a 20% by weight water glass solution to the water, adding a zinc hydroxide suspension to adjust the pH to from 8 to 9, and stirring the resultant fluorescent material for about 2 to 6 hours;

dehydrating and drying the surface-treated fluorescent material; and screen-sizing the dried fluorescent material to obtain salvage fluorescent material.

6. The method of claim 5, wherein said zinc hydroxide suspension is added in an amount of about 0.1 to 0.35% by weight of zinc hydroxide solid component, based on the weight of the recovered fluorescent material.

7. The method of claim 5, wherein said zinc hydroxide suspension is formed by adding zinc hydroxide to water and dispersing said zinc hydroxide with a micro agitator at about 1000 to 3,000 r.p.m. for 30 minutes.

8. A method for processing fluorescent material, which comprises the steps of:

recovering fluorescent material removed from a fluorescent screen of a color image receiving tube on developing a fluorescent coating on said fluorescent screen;

dispersing the recovered fluorescent material in water;

cleaning the dispersed fluorescent material with an aqueous alkali solution and a hypochlorous acid compound, said hypochlorous acid compound acting to remove an aluminum compound of green fluorescent material;

draining the resultant supernatant from said fluorescent material;

washing the resultant fluorescent material with water by dispersing said resultant fluorescent material in water, adding ammonium carbonate as a precipitating accelerator, stirring the fluorescent material dispersion to precipitate said fluorescent material, and draining the supernatant therefrom;

treating the washed fluorescent material with an acid;

surface-treating the acid-treated fluorescent material;

cleaning the surface-treated fluorescent material with water;

dehydrating and drying the water-cleaned fluorescent material; and screen-sizing the dried fluorescent material to obtain salvage fluorescent material.

9. The method of claim 8, wherein said hypochlorous acid compound is calcium hypochlorite.

10. The method of claim 8, wherein said step of treating with an acid is carried out by adding said washed fluorescent material to water; heating the washed fluorescent material dispersion to 65° C.; adding nitric acid to adjust pH; and stirring the adjusted fluorescent material for about 1 hour.

11. A method for processing fluorescent material attached to pigment by a latex, which comprises the steps of:

recovering pigment-attached fluorescent material removed from a fluorescent screen of a color image receiving tube on developing a fluorescent coating on said fluorescent screen;

dispersing the recovered fluorescent material in water;

cleaning the dispersed fluorescent material with an aqueous alkali solution to remove the latex and impurities from said fluorescent material;

draining the supernatant from said fluorescent material;

washing the resultant fluorescent material with water by dispersing said resultant fluorescent material in water, adding ammonium carbonate as a precipitating accelerator, stirring the fluorescent material dispersion to precipitate said fluorescent material, and draining the supernatant therefrom;

adding pigment to the washed fluorescent material;

dehydrating and drying said washed fluorescent material; and screen-sizing the dried fluorescent material to obtain salvage fluorescent material.

12. The method of claim 11, wherein said aqueous alkali solution contains a corrosive agent for corroding said latex.

13. The method of claim 11, wherein said fluorescent material is blue and said pigment is $Al_2O_3CoO$.

* * * * *